(12) United States Patent
Zhuang et al.

(10) Patent No.: US 10,459,714 B2
(45) Date of Patent: Oct. 29, 2019

(54) METHOD OF UPDATING FIRMWARE OF CLOSED STORAGE DEVICE (71) Applicant: CoolBitX Ltd., Grand Cayman (KY)

(72) Inventors: Jay Zhuang, Taipei (TW); Shih Mai Ou, Taipei (TW)

(73) Assignee: COOLBITX LTD., Grand Cayman (KY)

(*) Notice: Subject to any disclaimer, the term of this patent is extended or adjusted under 35 U.S.C. 154(b) by 0 days.

(21) Appl. No.: 15/848,955

(22) Filed: Dec. 20, 2017

(65) Prior Publication Data

US 2019/0187970 A1 Jun. 20, 2019

(51) Int. Cl.
| G06F 21/57 | (2013.01) |
| G06F 9/4401 | (2018.01) |
| G06F 16/176 | (2019.01) |
| G06F 16/23 | (2019.01) |
| G06F 12/00 | (2006.01) |
| G06F 13/16 | (2006.01) |
| G06F 15/78 | (2006.01) |
| G06F 8/65 | (2018.01) |
| G06F 3/06 | (2006.01) |
| G06F 12/14 | (2006.01) |
| H04L 9/32 | (2006.01) |
| G06F 9/445 | (2018.01) |

(52) U.S. Cl.
CPC ............. *G06F 8/65* (2013.01); *G06F 3/0607* (2013.01); *G06F 9/4401* (2013.01); *G06F 9/445* (2013.01); *G06F 12/14* (2013.01); *H04L 9/3247* (2013.01)

(58) Field of Classification Search
CPC . G06F 21/34; G06F 21/77; G06F 8/65; G06F 8/658; G06F 9/445; G06F 12/14; G06F 9/4401; G06F 3/0607; G06F 12/0623; G06F 12/00; G06F 12/0607; G06F 13/1647; G06F 15/7857; H04L 67/2852; H04L 9/3247
USPC .......................................... 717/169, 100–168
See application file for complete search history.

(56) References Cited

U.S. PATENT DOCUMENTS

| 9,675,051 | B2* | 6/2017 | Bonge, Jr. ............ A01K 27/009 |
| 2009/0261172 | A1* | 10/2009 | Kumar .................. H04L 9/0838 |
| | | | 235/492 |
| 2011/0185435 | A1* | 7/2011 | Chang ..................... G06F 12/14 |
| | | | 726/27 |

(Continued)

*Primary Examiner* — Chat C Do
*Assistant Examiner* — Noor Alkhateeb
(74) *Attorney, Agent, or Firm* — Rabin & Berdo, P.C.

(57) ABSTRACT

A method of updating firmware of closed storage device includes the steps of connecting an electronic device to a closed storage device having built-in first and second memories and bootstrap loader, and the first memory storing a first application that is set by the bootstrap loader as a default boot loader; the electronic device downloading a second application having a different version from the first application and setting the first memory to a locked state; the electronic device transmitting the second application to the second memory via the bootstrap loader and the second memory is updated when the second application is written thereinto; and the bootstrap loader setting the second application as the boot loader. The two applications of different versions in the closed storage device are updated alternately, and the old application can still be used as the boot loader when the update of the other application has failed.

3 Claims, 6 Drawing Sheets (56) References Cited

U.S. PATENT DOCUMENTS

| | | | |
|---|---|---|---|
| 2015/0288523 A1* | 10/2015 | Burghardt | G06F 21/34 |
| | | | 726/20 |
| 2016/0015004 A1* | 1/2016 | Bonge, Jr. | A01K 27/009 |
| | | | 119/718 |
| 2016/0085558 A1* | 3/2016 | Anbazhagan | G06F 8/654 |
| | | | 713/2 |
| 2017/0010881 A1* | 1/2017 | Kawazu | G06F 8/65 |
| 2017/0115981 A1* | 4/2017 | Oh | G06F 8/65 |
| 2018/0060589 A1* | 3/2018 | Polak | H04L 63/123 |
| 2018/0205743 A1* | 7/2018 | McIver | H04L 63/0823 |
| 2018/0336352 A1* | 11/2018 | Dooley | G06F 21/575 |

* cited by examiner

METHOD OF UPDATING FIRMWARE OF CLOSED STORAGE DEVICE

FIELD OF THE INVENTION

The present invention relates to a firmware updating method, and more particularly, to a method of updating firmware of a closed storage device, with which, when an application of a different version is detected, one of two memories in the closed storage device is switched to a locked state, in which no application update can be performed, while the application having the new version is written into another memory to update the same.

BACKGROUND OF THE INVENTION

Following the technological advancements, many conventional manners of transactions and payments are gradually replaced by integrated circuit (IC) cards. Among others, financial cards, public phone payment cards and prepayment cards are now very common IC cards. Generally, according to the data access manners, IC cards can be divided into contact IC cards, contactless IC cards and hybrid IC cards.

In the case of a contact IC card, the data stored therein is accessed via metal contact pads provided on the card. Examples of the contact IC cards include different chip financial cards. In the case of a contactless IC card, the data stored therein is accessed via RF induction. Examples of the contactless IC cards include the prepayment cards or electronic wallets applicable to public transport means. After various types of IC cards have been available in the market, there is developed a hybrid or combination IC card having two different data access interfaces. The hybrid IC card integrates different functions of the credit card, financial card, electronic wallet and prepayment card into one single IC card, enabling a user to receive diversified services with only one card.

Presently, the commonly used IC card internally includes one microprocessor and one memory. The memory has an application stored therein and the application is executable by the microprocessor. When the IC card has bugs or requires application improvement, a firmware update of the application is needed. Usually, to update the firmware of the application, a new version firmware image file is transmitted to the memory via a physical transmission medium, such as a flash disk, an optical disc or a memory card, or via an Internet transmission protocol, such as the Hyper Text Transport Protocol (HTTP) or the Trivial File Transfer Protocol (TFTP), so that the memory updates the application according to the new version firmware image file and changes the application to an updated application.

However, in the event the memory updates the application using the new version firmware image file but the update is has failed, the updated application will lack a part of the code and will not be able to be executed by the microprocessor. In this case, the IC card will fail. A way for the failed IC card to operate successfully is to let the memory use the new version firmware image file to update the application again. However, in a worse condition, the settings of the IC card must be restored to reset the application to its initial state and then try the update operation again. This condition will doubtlessly cause inconvenience in using the IC card.

SUMMARY OF THE INVENTION

A primary object of the present invention is to provide a method of updating firmware of closed storage device, with which two memories are provided in the closed storage device and can be updated alternately with an application having a newer version, and the old version application stored in one of the two memories can still be used as a boot loader of the closed storage device to perform transactions in case the new version application has bugs and could not be executed to perform any transaction.

Another object of the present invention is to provide a method of updating firmware of closed storage device, with which two memories are provided in the closed storage device and can be updated alternately with an application having a newer version, and the old version application stored in one of the two memories will be automatically executed to enable transactions via the closed storage device in case the updating of another memory with the newer version application is failed and the closed storage device could not be used to perform any transaction or the updated application stored in the closed storage device has to be reset to the default settings.

To achieve the above and other objects, the method of updating firmware of closed storage device according to the present invention includes the following steps: providing an electronic device and connecting the same to a closed storage device via a network; the closed storage device internally including a bootstrap loader, a first memory and a second memory, and the bootstrap loader setting a first application stored in the first memory to be a boot loader and being able to execute the first application; and the electronic device having a second application stored therein, and the second application having a version different from that of the first application; and the electronic device switching the first memory to a locked state when the electronic device detects the second application has a version different from that of the first application, and no application update being performable on the first memory when the same is in the locked state.

The firmware updating method further includes the following steps: the electronic device transmitting the second application and an initial electronic signature to the bootstrap loader, and the bootstrap loader transmitting the second application and the initial electronic signature to the second memory and a security chip provided in the closed storage device, respectively; and the electronic device switching one of the first and the second memory to the locked state in the event both the first and the second memory having the first application stored therein, and the bootstrap loader transmitting the second application to another one of the first and the second memory that is not switched to the locked state.

The firmware updating method of the present invention further includes the following steps: writing the second application being into the second memory to update the same, and the bootstrap loader setting the second application to be the boot loader and executing the second application; after the second application having been written into the second memory to complete updating the second memory, the second memory generating eigenvalue information and transmitting the same to the bootstrap loader, and the bootstrap loader in turn storing the eigenvalue information and transmitting the same to the security chip; the bootstrap loader then using the eigenvalue information to perform calculations on a transaction authorizing electronic signature that has been transmitted by the electronic device to the closed storage device, and the security chip using the eigenvalue information to verify the calculated transaction authorizing electronic signature; and, in the event the updating of the second memory fails, the bootstrap loader sets the first application to be the boot loader again and executes the first application. According to the firmware updating method of the present invention, when the security chip has the eigenvalue information and the electronic signature stored therein, the bootstrap loader in the closed storage device will set the second application to be the boot loader.

The firmware updating method of the present invention is characterized in that, before the updating, the electronic device will switch the first memory having the first application stored therein to the locked state when the electronic device detected the second application has a version different from that of the first application, and the bootstrap loader of the closed storage device will write the second application into the second memory to update the same and set the second application to be the boot loader. In this manner, the closed storage device can have a first and a second application of different versions stored therein, and the first and the second application are updated alternately. Therefore, in the event the second application has bugs to cause failed transaction, the bootstrap loader of the closed storage device can set the first application to be the boot loader again for performing transactions. Therefore, it is able to avoid the situation of being unable to perform transactions using the closed storage device.

Further, in case the updating of the second application is failed and the bootstrap loader could not execute the second application, the first application can be set to be the boot loader again to enable transactions. Therefore, the closed storage device can be conveniently used to perform transactions without the risks of unexpectedly becoming failed or requiring reset of the updated application to default settings.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof and by referring to the accompanying drawings.

Figure 1:
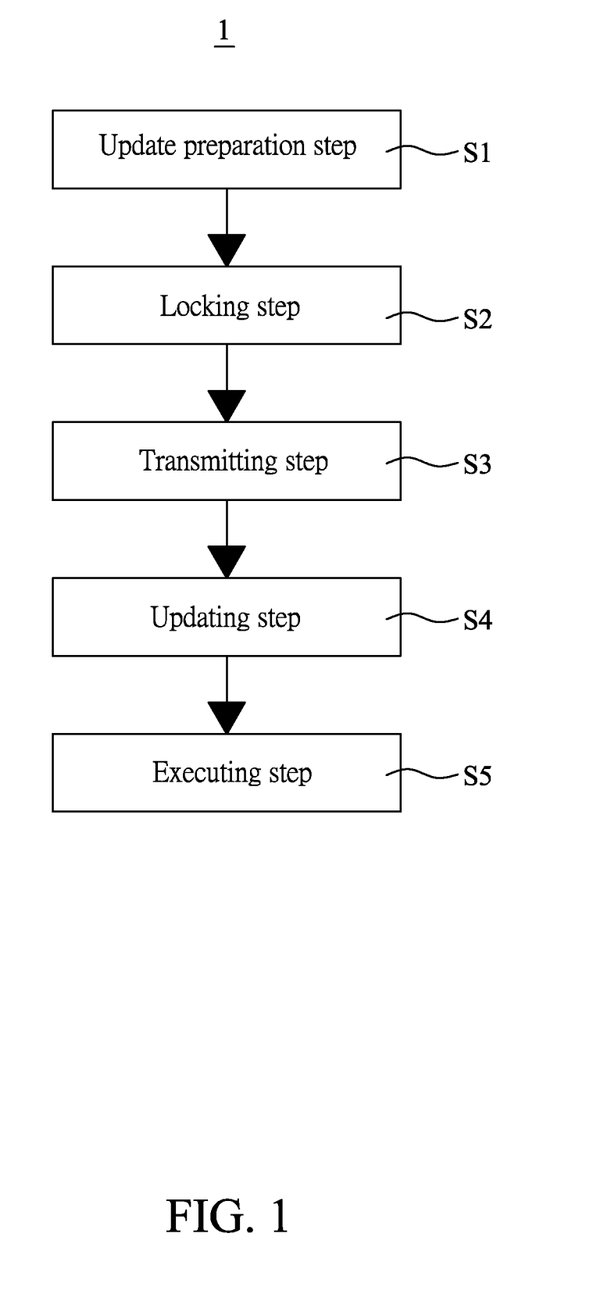
FIG. 1 is a flowchart showing the steps included in a method of updating firmware of closed storage device according to a preferred embodiment of the present invention.

Please refer to FIG. 1 that is a flowchart showing the steps included in a method of updating firmware of closed storage device according to a preferred embodiment of the present invention. For the purpose of conciseness and clarity, the method according to the present invention is also briefly referred to as the firmware updating method herein and is generally denoted by reference numeral 1. Also please refer to FIG. 2 that is a modular view of a firmware updating system 2 according to the present invention to be used with the firmware updating method 1. As shown, the firmware updating system 2 includes an electronic device 20 and a closed storage device 21. The electronic device 20 has application software 201 installed therein and can be a mobile phone, a computer or a tablet computer.

Figure 2:
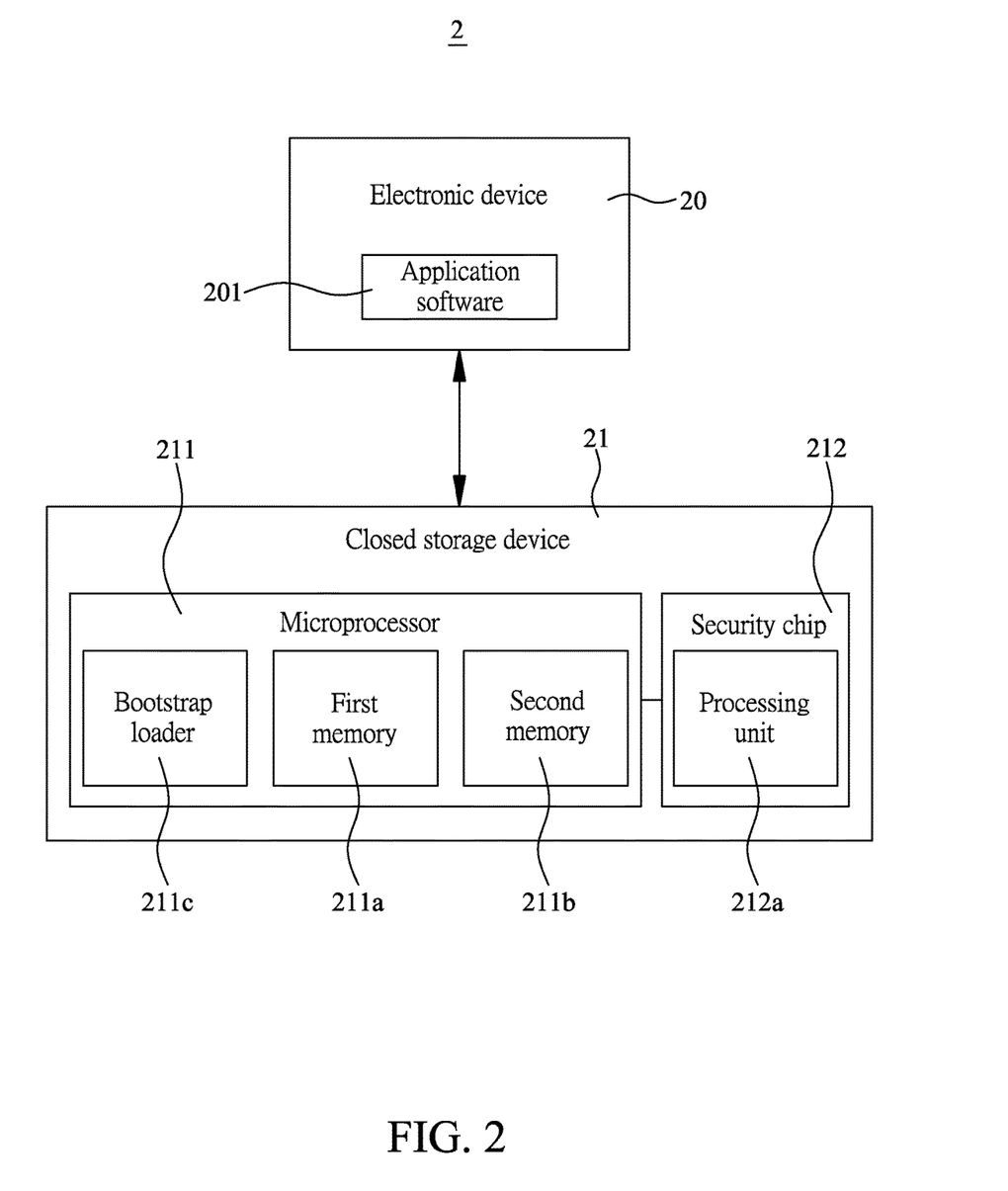
FIG. 2 is a modular view of a firmware updating system for use with the method of updating firmware of closed storage device according to the present invention.

The closed storage device 21 can be selectively connected to or disconnected from the electronic device 20 via a network, Bluetooth or infrared, so that the closed storage device 21 can be connected to or disconnected from the application software 201 via the electronic device 20. The closed storage device 21 includes a microprocessor 211 and a security chip 212. The microprocessor 211 has a first memory 211a, a second memory 211b and a bootstrap loader 211c provided therein, and is electrically connected to the security chip 212. The first memory 211a has a first application program stored therein. Further, the security chip 212 includes a processing unit 212a. The bootstrap loader 211c sets the first application program, which is also briefly referred to as the first application herein, to be a boot loader, and can execute the first application to perform a transaction. When the electronic device 20 has the application software 201 installed on, the application software 201 will display an electronic signature on a touch screen of the electronic device 20. At the first time the application software 201 is connected to the closed storage device 21, the application software 201 in the electronic device 20 will store the aforesaid electronic signature in the security chip 212. The electronic signature stored in the security chip 212 is used to check and determine whether the transaction can be performed or to check and determine any information about software updating, and is also referred to as the initial electronic signature herein.

Figure 3:
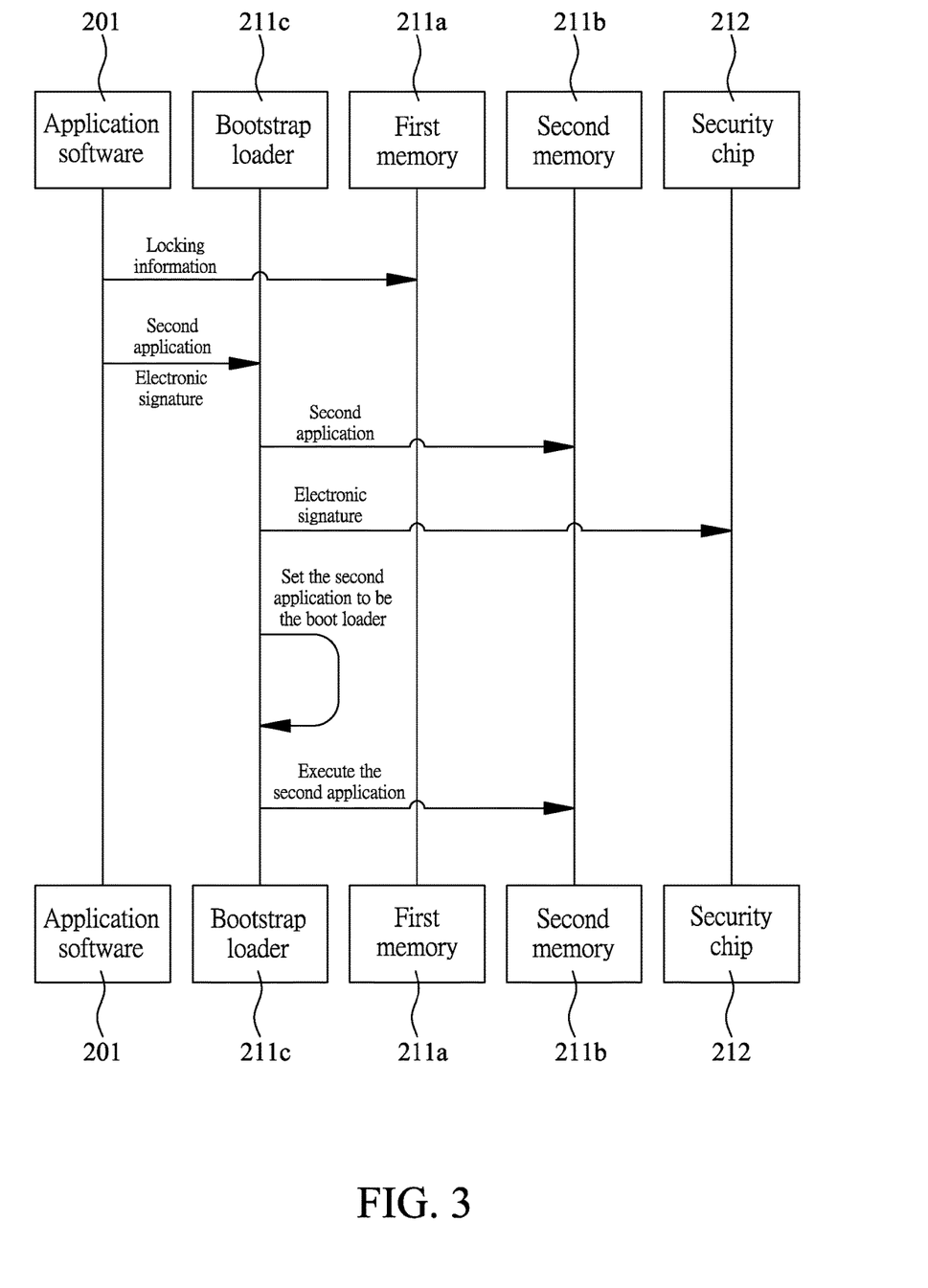
FIG. 3 shows procedures executed in the steps of the method of the present invention from a first update preparation step to a fourth updating step.
Figure 4:
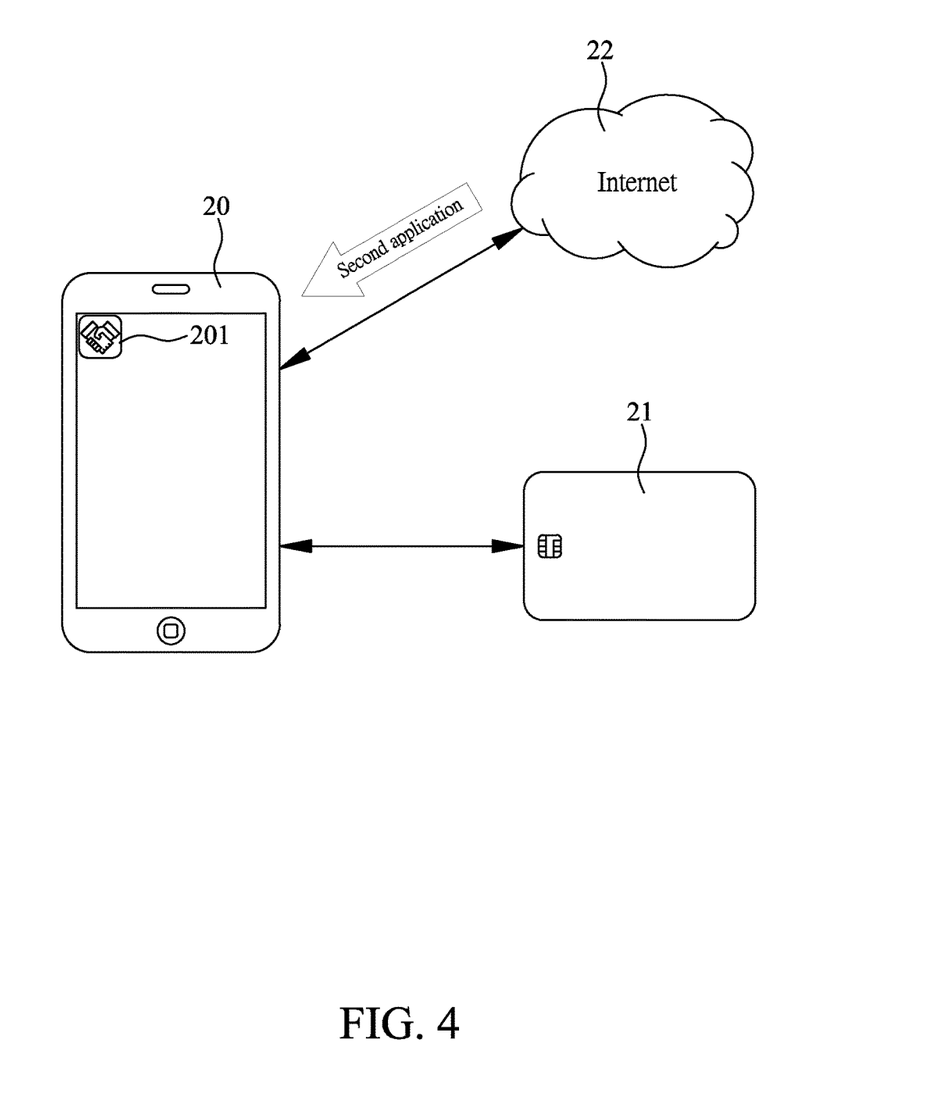
FIG. 4 is a conceptual view of the update preparation step shown in FIG. 1.

Please refer to FIG. 1 along with FIGS. 3 and 4. When the closed storage device 21 is to be updated, the electronic device 20 is connected to a network, such as the Internet 22, and to the closed storage device 21 at the same time. The electronic device 20 can download from the Internet 22 a second application program having a version different that of the first application. Herein, the second application program can also be briefly referred to as the second application. After the second application has been stored in the electronic device 20, a first step, i.e. an update preparation step S1 of the firmware updating method of the present invention is completed. According to the illustrated preferred embodiment of the present invention, the second application has a newer version than the first application.

Figure 5:
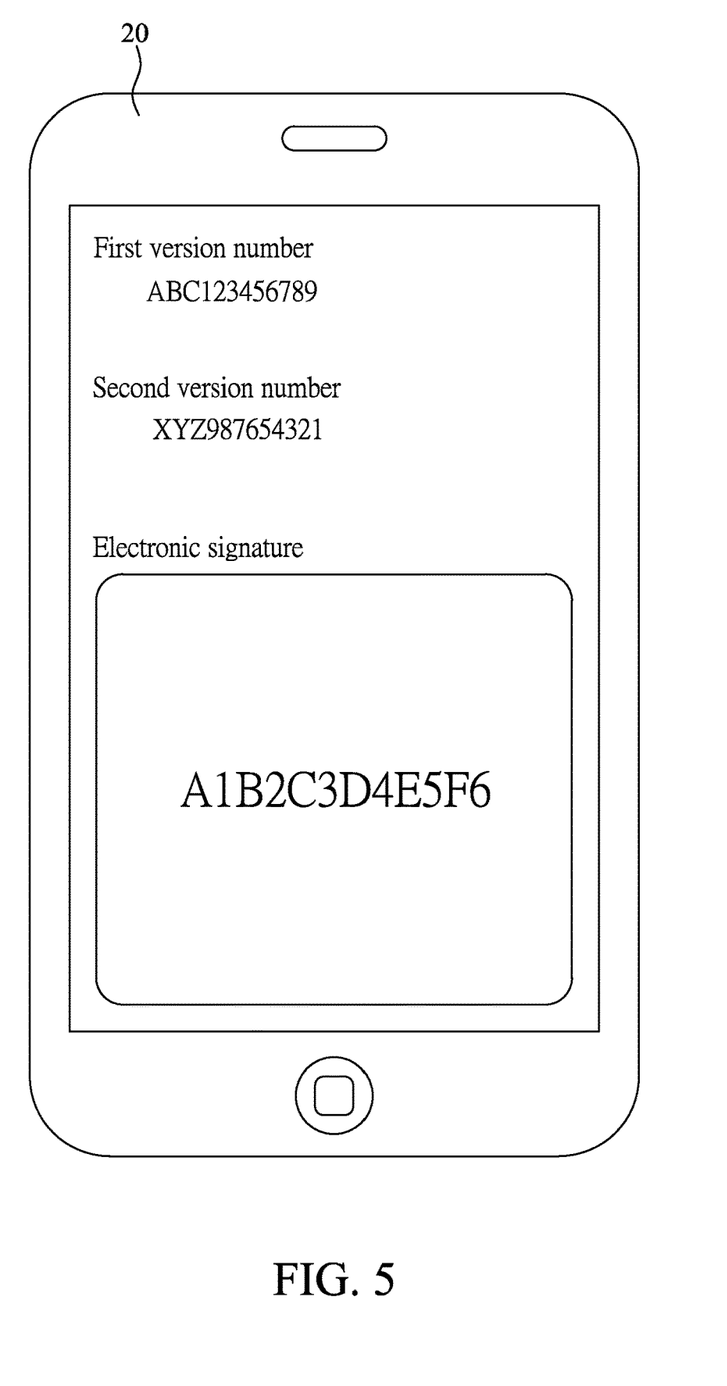
FIG. 5 is a conceptual view of a locking step shown in FIG. 1, in which two version numbers are checked.

Please refer to FIG. 1 along with FIGS. 3 and 5. A second step, i.e. a locking step S2, is performed after completion of the update preparation step S1. After the second application has been stored on the electronic device 20, the application software 201 installed on the electronic device 20 will retrieve from the first and the second application a first and a second version number, respectively. Since the second version number is different from the first version number, the application software 201 can detect that the first application has an older version than the second application and accordingly, generates and transmits locking information to the first memory 211a, so that the first memory 211a is switched to a locked state, in which no application update can be performed on the first memory 211a. Then, a user can operate on a touch screen of the electronic device 20 to input an electronic signature, which is a piece of information used to authorize the update and is also referred to as the update authorizing electronic signature herein.

Figure 6:
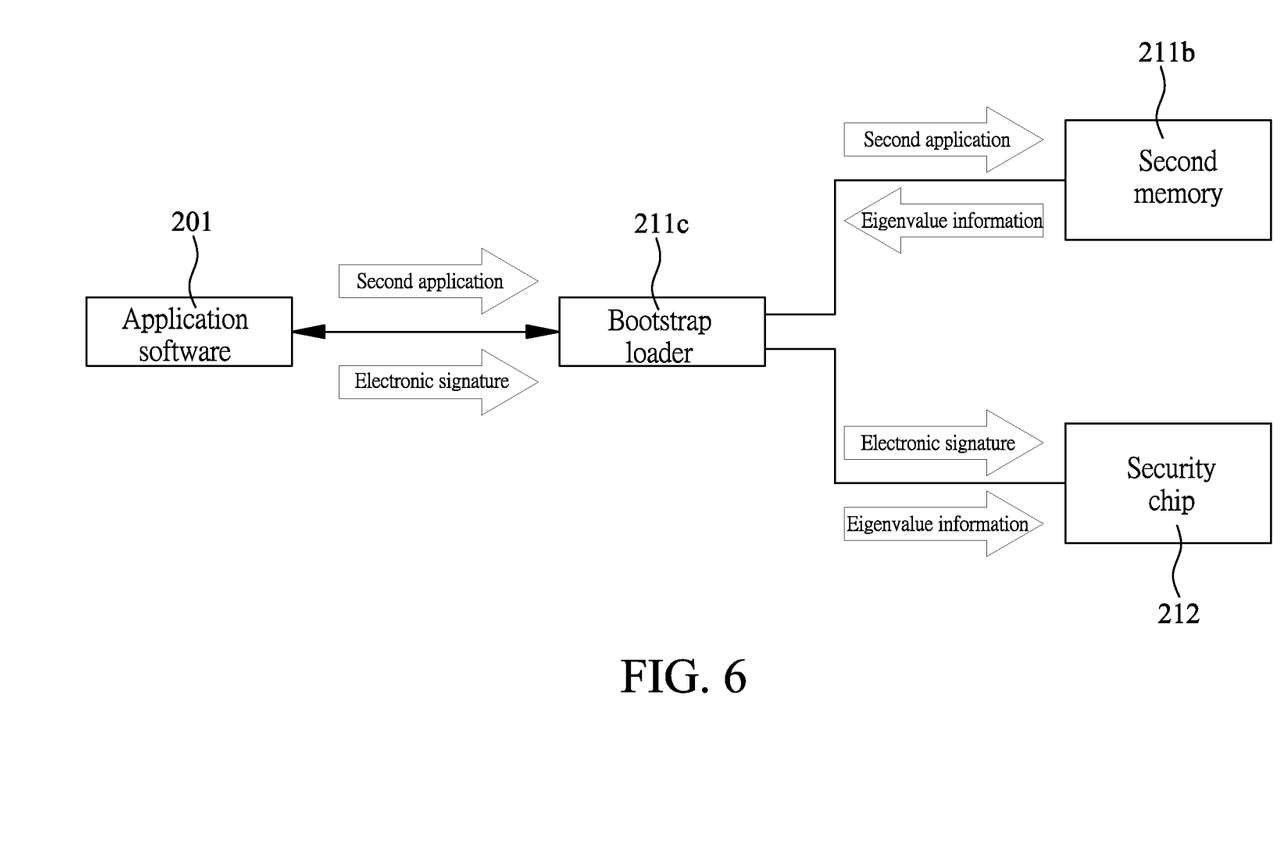
FIG. 6 is a conceptual view of a transmitting step shown in FIG. 1, in which an initial electronic signature and an update authorizing electronic signature are compared.

Please refer to FIG. 1 along with FIGS. 3 and 6. A third step, i.e. a transmitting step S3, is followed. In the Step S3, the electronic device 20 transmits the second application and the update authorizing electronic signature to the bootstrap loader 211c in the closed storage device 21. Since the first memory 211a is in the locked state, the bootstrap loader 211c will transmit the second application to the second memory 211b and transmit the update authorizing electronic signature to the security chip 212.

In the illustrated preferred embodiment, since the first application is stored only in the first memory 211a without being stored in the second memory 211b, the electronic device 20 having stored the second application downloaded from the Internet 22 will switch the first memory 211a to the locked state and the second application is further transmitted to the second memory 211b. However, in the event both the first and the second memory 211a, 211b have the first application stored therein and the electronic device 20 has stored the second application downloaded from the Internet 22, the application software 201 installed on the electronic device 20 can selectively switch one of the first and the second memory 211a, 211b to the locked state and then transmits the second application to the other one of the first and the second memory 211a, 211b that is not locked.

As shown, when the second memory 211b receives the second application and the security chip 212 receives the update authorizing electronic signature, the security chip 212 will compare the initial electronic signature having been stored therein with the update authorizing electronic signature. In the case the update authorizing electronic signature matches the initial electronic signature, the second application will be written into the second memory 211b, so that the second memory 211b now has the second application stored therein. At this point, a fourth step of the firmware updating method 1, i.e. an updating step S4, is completed. On the other hand, in the case the update authorizing electronic signature does not match the initial electronic signature, the second application will not be written into the second memory 211b, and the second memory 211b could would not have the second application stored therein. In this case, the updating step S4 is has failed.

When the updating step S4 is completed, information of an eigenvalue or characteristic value is generated by the second memory 211b and transmitted to the bootstrap loader 211c. The bootstrap loader 211c stores the eigenvalue information and also transmits the same to the security chip 212, which will also store the eigenvalue. At this point, the security chip 212 has the eigenvalue information and both the initial and update authorizing electronic signatures stored therein, and the bootstrap loader 211c will set the second application to be the boot loader. Herein, the eigenvalue information refers to an algorithm that performs calculations on information to verify the information. In the illustrated preferred embodiment of the present invention, the aforesaid eigenvalue information is a hash function.

After completion of the updating step S4, a fifth step, i.e. an executing step S5, is performed. When the user wants to perform a transaction, the user first inputs transaction information via the electronic device 20, such as seller's and buyer's transaction accounts, purchase amount, sale amount and so on, and enters on the touch screen of the electronic device 20 to form an electronic signature, which is information used to authorize the transaction and is also briefly referred to as the transaction authorizing electronic signature herein. The transaction authorizing electronic signature will be verified using the initial electronic signature stored in the security chip 212. Then, the electronic device 20 transmits the transaction information and the transaction authorizing electronic signature to the closed storage device 21. At this point, the microprocessor 211 in the closed storage device 21 will execute the second application and the bootstrap loader 211c will use the aforesaid eigenvalue information to perform calculations on the transaction authorizing electronic signature. The calculated result is transmitted to the security chip 212. The processing unit 212a of the security chip 212 will use the eigenvalue information to verify the calculated transaction authorizing electronic signature. When the security chip 212 has verified that the internally stored initial electronic signature is the same as the transaction authorizing electronic signature, a digital asset will be transferred to complete the transaction.

However, in the event the second application could not be written into the second memory 211b, the bootstrap loader 211c will set the first application to be the boot loader again, so that the microprocessor 211 can execute the first application to perform the transaction.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A method of updating firmware of a closed storage device, comprising the following steps:
    providing an electronic device and connecting the electronic device to the closed storage device via a network, the closed storage device internally including a bootstrap loader, a first memory, a second memory, and a security chip;
    setting, by the bootstrap loader, a first application stored in the first memory to be a boot loader, the bootstrap loader being able to execute the first application, the electronic device having a second application stored therein, and the second application having a version different from a version of the first application;
    installing, by the electronic device, an application software, the application software generating an initial electronic signature and transmitting the initial electronic signature to the security chip;
    switching, by the electronic device, the first memory to a locked state when the electronic device detects the second application is a newer version than the first application, such that no application update is performable on the first memory when the first memory is in the locked state;
    transmitting, by the electronic device, the second application and an update authorizing electronic signature to the bootstrap loader, and the bootstrap loader transmitting the second application and the update authorizing electronic signature to the second memory and the security chip provided in the closed storage device, respectively; and
    when the update authorizing electronic signature matches the initial electronic signature stored in the security chip, writing the second application into the second memory to update the second memory so that the second memory has the second application stored therein, and the bootstrap loader setting the second application to be the boot loader and executing the second application, wherein, after the second application has been written into the second memory to complete updating the second memory, the eigenvalue information is obtained from the second memory and the eigenvalue information is transmitted to the bootstrap loader, and the bootstrap loader in turn stores the eigenvalue information and transmits the eigenvalue information to the security chip, the bootstrap loader then uses the eigenvalue information to perform calculations on a transaction authorizing electronic signature that has been transmitted by the electronic device to the closed storage device, and the security chip uses the eigenvalue information to verify the calculated transaction authorizing electronic signature.

2. The method of updating firmware of the closed storage device as claimed in claim 1, wherein the electronic device switches one of the first and the second memory to the locked state in the event both the first and the second memory have the first application stored therein, and the bootstrap loader transmits the second application to another one of the first and the second memory that is not switched to the locked state.

3. The method of updating firmware of the closed storage device as claimed in claim 1, wherein, in the event the updating of the second memory has failed, the bootstrap loader sets the first application to be the boot loader again and executes the first application.

* * * * *